Oct. 19, 1965     T. J. McCUSKER     3,213,285
HELIOTROPIC ORIENTATION MECHANISM
Filed Nov. 16, 1961
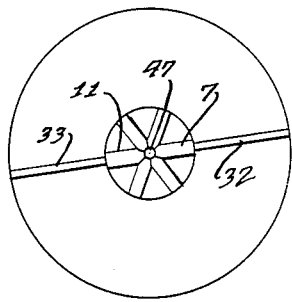
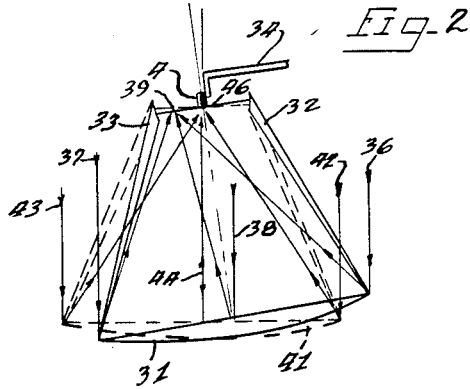
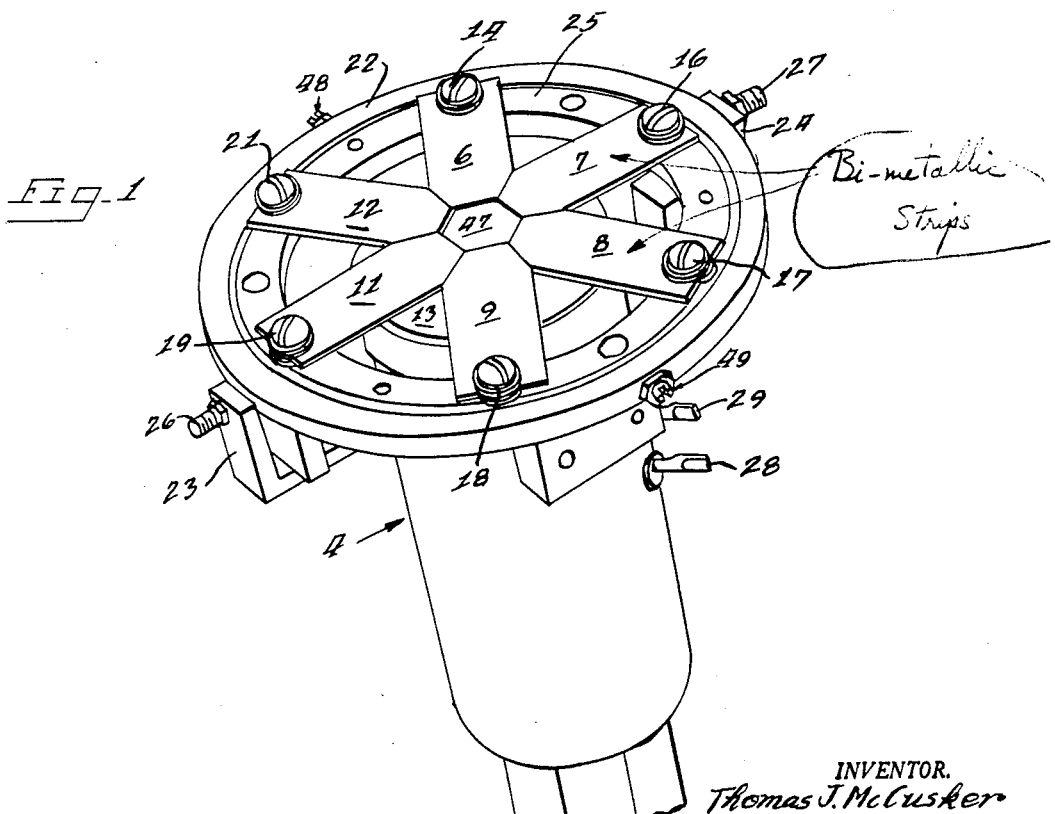
INVENTOR.
Thomas J. McCusker
BY
Hill Sherman Meroni Gross & Simpson
ATTORNEYS United States Patent Office 3,213,285
Patented Oct. 19, 1965

3,213,285
HELIOTROPIC ORIENTATION MECHANISM
Thomas J. McCusker, Akron, Ohio, assignor to
TRW Inc., a corporation of Ohio
Filed Nov. 16, 1961, Ser. No. 152,880
8 Claims. (Cl. 250—215)

The present invention relates to a solar concentrator and more particularly to a means and method to correctly orientate the solar concentrator by a misorientation sensing means.

In a design of solar thermionic power systems a problem is presented in connection with the desirability of continuously and effective orientating a solar concentrator. The usual sun-seeking mechanisms require amplification of an error signal strength or an error amplitude from some external power source. A correction of alignment is then mechanically accomplished from an external power source. Such correction by the external power source is usually by an associated flywheel or rocket orientation mechanisms. Due to the high accuracies of orientation required by solar thermionic power systems, such prior art arrangements have been substantially ineffective.

It is an object of the present invention to effect the elimination of the complexities associated with flywheels or rocket orientation mechanisms of the prior art.

It is a further object of the invention to use the error signal to directly orientate the concentrator for the effective use of a solar thermionic power system in space application.

It is an object of the invention to provide a means that will sense and directly orientate a solar concentrator.

It is another object of the invention to provide a heliotropic solar concentrator that detects misorientation of solar energy and directly orientates said solar energy.

It is another object of the invention to provide a concentrator mount that is pivotally connected to a paraboloidal concentrator and a solar energy converter by solar energy sensing means that corrects misalignment of the solar energy concentrator.

It is another object of the invention to provide a heliotropic concentrator that comprises a thermomechanical positioning mechanism to correctly orientate any misorientation of solar energy concentration.

It is still another object of the invention to provide a heliotropic concentrator comprising thermomechanical bimetallic positioning means that senses the misorientation of concentrated solar flux and orientates the heliotropic concentrator so as to align the concentrated solar flux with a solar energy converter.

On the drawings:

FIGURE 1 is a perspective view of a solar thermionic converter connected to a solar energy concentrator mount;

FIGURE 2 shows a side view of a solar concentrator being orientated; and

FIGURE 3 shows a top view of the solar concentrator shown in FIGURE 2.

As shown on the drawings:

The invention advantageously exploits the utilization of thermal sensing means such as bi-metallic sensing strips and liquid capillary sensing means as a thermomechanical positioning means. When an increase in temperature occurs, the thermal sensing means mechanically orientates a solar concentrator. The bi-metallic sensing strip is mounted onto a thermionic converter and a solar concentrator to align the sun rays that are misorientated away from the converter. A "bi-metal" is a device utilizing two pieces of metal having different thermal coefficients of expansion and is capable of producing a mechanical movement as a function of a variation in temperature. The bi-metallic strips realign the sun rays that are concentrated on them with the thermionic converter by mechanically pivoting the solar concentrator.

FIGURE 1 shows bi-metallic sensing strips 6, 7, 8, 9, 11 and 12 which are mounted on a sensing strip support 25 by means of the screws 14, 16, 17, 18, 19 and 21. The sensing strip support is mounted on a gimbal ring 22 by means of pivots 48 and 49. The gimbal ring is mounted on brackets 23 and 24 by means of pivots 26 and 27. The brackets are attached to a solar energy thermionic converter 4. Attached to the converter are power outlets 28 and 29 which supply power for a solar thermionic power system. Also attached to the converter 4, is a bearing surface 13 which is positioned so as to deflect the bi-metal sensing elements sufficiently to insure that the elements remain in contact with the bearing surface under all conditions of operation.

The paraboloidal concentrator 31 is mounted to the sensing strip support 25 by the concentrator support rods 32 and 33 (FIGURE 2).

The paraboloidal concentrator 31 reflects the sun rays off its surface in such a manner that they are focused at a predetermined distance away from the concentrator 31. The distance of the converter 4 away from the concentrator 31 is determined by this focal point. Also the distance desired may be obtained by the use of a particular concave curvature on the concentrator 31.

As is shown in FIGURE 2, the thermionic converter 4 is mounted on a support 34 from the space vehicle (not shown). The solar energy thermionic converter 4 is attached to the gimbal ring 22 by brackets 23 and 24. The sensing strip support 25 is pivotally mounted on the gimbal ring 22 and is connected to the paraboloidal solar concentrator 31 by the arms 32 and 33. Solar energy rays 36, 37 and 38 are reflected from the paraboloidal concentrator 31 upwardly and focus at a focal point 39 which is not aligned with the converter 4. The concentration of sun rays at the focal point 39 produces a temperature increase on the bi-metallic strip which distorts the bi-metallic strip and thereby moves the paraboloidal concentrator 31 to the position 41 and the sun rays to the positions 42, 43, and 44 so as to have a correct focal point 46. Thus the concentrated solar energy flux 46 is directed onto the thermionic converter 4 through an opening 47 formed by the ends of the bi-metallic sensing strips, shown in FIGURE 1.

One of the typical types of converter used is a cesium thermionic converter. A cesium thermionic converter requires a high operating temperature of 2,000 to 2,400° K. in order to be effective for solar thermionic power systems. To attain such a high operating temperature from the sun, a high degree of accuracy is required in the concentrating of sun rays so as to have their focal point keyed in on the cesium converter. When the focal point of the sun rays is not on the converter the unconcentrated solar energy flux that the converter absorbs is extremely insufficient. The concentrated solar energy flux, when at the focal point of the concentrator is many times greater than the unconcentrated solar energy flux.

The heliotropic system as shown in the invention is operated in the hereinafter described method. The sun rays, upon contact with the paraboloidal concentrator that is misorientated, are reflected upwards to a concentrated focal point that is focused on one of the bi-metallic elements. The high heat concentrated on the bi-metallic element by the concentrated sun rays distorts the element. The distortion of the bi-metallic element causes the concentrator to move into proper alignment. The relative motion between the converter and the concentrator mount, to keep the converter aperture at the focal point, is accomplished by connecting the converter and the concentrator or mount by two gimbal axes.

The concentrator is rotated on an axis by a particular bi-metallic sensing strip. For example, if bi-metallic strip 6 is contacted by the concentrated solar energy flux, the bi-metallic strip would distort to prevent a concave surface. The end connected by the screw 14 would raise causing the paraboloidal concentrator to rotate towards the bi-metallic strip 6. This is accomplished by the fact that the converter 4 and the bearing surface 13 are on a substantially fixed axis while the sensing strip support 25 is on a rotatable axis.

Although the invention has been described as using six bi-metallic elements, it is understood that more than six or less than six may be used depending on the type and degree of alignment desired. It may also be noted that other thermo sensitive means such as liquid capillaries may be used instead of bi-metallic sensing strips to bring about the direct thermomechanical positioning of the heliotropic solar concentrator.

Although various minor modifications of the present invention may become readily apparent to those skilled in the art, it should be understood that I wish to embody within the scope of the patent warranted hereon all such embodiments as reasonably and properly come within the scope of my contribution to the art.

I claim as my invention:

1. A solar energy concentrator comprising:
    a solar energy converter for converting solar energy into usable energy,
    said converter having a bearing face,
    a plurality of bi-metallic sensing strips fixedly secured to said bearing face adjacent one end thereof and extending radially from the converter,
    one end of said bi-metallic strips forming a sun ray opening leading into the converter,
    a sensing strip support,
    the other end of said bi-metallic strips being fixedly secured to said sensing strip support,
    a gimbal support,
    means mounting the gimbal support to the converter,
    means connecting the gimbal support to the sensing strip support,
    a concentrator having a reflecting surface facing the converter bearing face,
    means connecting the concentrator to the sensing strip support to normally reflect sun rays from the reflecting surface and thereby concentrate the sun rays at a focal point located at the sun ray opening leading into the converter to provide said converter with the concentrated sun rays, and
    said bi-metallic sensing strips being connected to pivot the concentrator relative to the substantially stationary converter,
whereby misorientated concentrated sun rays contact one of the bi-metallic sensing strips to distort the one bi-metallic strip and pivot the reflector to orientate the concentrated sun rays into the sun ray opening and off the one bi-metallic strip.

2. A solar energy concentrator comprising:
    a solar energy converter for converting solar energy into usable energy,
    said converter having a bearing face,
    a plurality of bi-metallic sensing strips fixedly secured to said bearing face adjacent one end thereof and extending radially from the converter,
    one end of said bi-metallic strips forming a sun ray opening leading into the converter,
    a sensing strip support,
    the other end of said bi-metallic strips being connected to said sensing strip support,
    a ring support,
    bracket means mounting the ring support to the converter,
    means connecting the ring support to the sensing strip support,
    a paraboloidal concentrator having a concave reflecting surface facing the converter bearing face,
    means securing the concentrator to the sensing strip support to normally reflect sun rays from the concave reflecting surface and concentrate the sun rays at a focal point located at the sun ray opening leading into the converter to provide said converter with the concentrated sun rays, and
    said bi-metallic sensing strips being connected to pivot the concentrator relative to the substantially stationary converter to constantly focus the concentrated sun rays into the converter through the sun ray opening.

3. A solar energy concentrator comprising:
    a solar energy converter for converting solar energy into usable energy,
    said converter having a bearing face,
    six bi-metallic sensing strips fixedly secured to said bearing face adjacent one end thereof and extending radially from the converter,
    one end of said bi-metallic strips forming a sun ray opening leading into the converter,
    a sensing strip support ring,
    the other end of said bi-metallic strips being secured to said sensing strip support ring,
    a gimbal ring support,
    means mounting the gimbal ring to the converter,
    means connecting the gimbal ring to the sensing strip support ring,
    a paraboloidal concentrator having a reflecting surface,
    support bars securing the concentrator to the sensing strip support ring to normally reflect sun rays from the reflecting surface to concentrate at a focal point located at the sun ray opening leading into the converter to provide said converter with the concentrated sun rays, and
    said bi-metallic sensing strips being connected to pivot the concentrator relative to the converter
whereby misorientated concentrated sun rays contact one of the bi-metallic sensing strips to distort the one bi-metallic strip and pivot the reflector to orientate the concentrated sun rays into the sun ray opening and off the one bi-metallic strip.

4. A solar energy concentrator comprising:
    a solar energy cesium converter for converting solar energy into usable energy,
    said converter having a bearing face,
    six bi-metallic sensing strips fixedly secured to said bearing face adjacent one end thereof and extending radially from the converter,
    one end of said bi-metallic strips forming a sun ray opening leading to cesium within the converter,
    a sensing strip support ring,
    the other end of said bi-metallic strips being fixedly secured to said sensing strip support ring,
    a gimbal ring support,
    a bracket means mounting the gimbal ring to the converter,
    means connecting the gimbal ring support to the sensing strip support ring,
    a paraboloidal concentrator having a concave reflecting surface facing the converter bearing face,
    support bars securing the concentrator to the sensing strip support ring to normally reflect sun rays from the concave reflecting surface to concentrate at a focal point located at the sun ray opening leading to the cesium to provide said cesium with the concentrated sun rays, and
    said bi-metallic sensing strips being mounted to pivot the concentrator relative to the converter
whereby misorientated concentrated sun rays contact one of the bi-metallic sensing strips to distort the one bi-metallic strip and pivot the reflector to orientate the concentrated sun rays into the sun ray opening and off the one bi-metallic strip.

5. A heliotropic solar concentrator mount comprising:

a solar energy cesium converter for converting solar energy into usable energy,
said converter having a bearing face,
a plurality of bi-metallic sensing strips fixedly secured to said bearing face adjacent one end thereof and extending radially from the converter,
the one end of said bi-metallic strips forming a sun ray opening leading to cesium within the converter,
a sensing strip support ring concentric with said converter and mounted to pivot relative thereto,
the other end of said bi-metallic strips being fixedly secured to said sensing strip support ring,
a gimbal ring support concentric with said converter,
bracket means mounting the gimbal ring to the converter,
means connecting the gimbal ring to the sensing strip support ring, and
said bi-metallic sensing strips being mounted to pivot the sensing ring support relative to the substantially stationary converter.

6. A solar energy concentrator comprising:
a paraboloidal concentrator reflecting sun rays to concentrate at a focal point a predetermined distance away from the concentrator,
a solar energy converter for converting solar energy into usable energy and mounted to be impinged by the concentrated rays at said focal point when in alignment therewith,
means pivotally mounting said concentrator to said converter and enabling adjustment for alignment of said focal point,
a plurality of thermomechanical devices connecting said converter and said concentrator,
said devices defining an aperture aligned with said converter adjacent to said focal point and opposite said concentrator,
and said devices being respectively impinged by the concentrated rays when the focal point is misaligned relative to the converter and acting in response to such impingement to pivot the concentrator and thereby to effect focal point alignment with the converter.

7. A solar energy concentrator as defined in claim 6, in which said thermomechanical devices comprise bi-metallic strips.

8. A solar energy concentrator as defined in claim 7, in which the bimetallic strips have one of their ends attached to the concentrator and have opposite ends which define said aperture, and the converter has a bearing surface against which the bimetallic strips remain in contact under all conditions of operation and through which the strips are connected to the converter.

References Cited by the Examiner
UNITED STATES PATENTS

| | | | |
|---|---|---|---|
| Re. 25,242 | 9/62 | Toulmin | 88—25 X |
| 1,976,428 | 10/34 | Arthuys et al. | 88—25 |
| 2,904,695 | 9/59 | White | 250—239 |
| 2,967,249 | 1/61 | Quirk | 250—215 |
| 2,993,125 | 7/61 | Geer et al. | 250—215 |
| 2,999,943 | 9/61 | Geer | 250—215 |

FOREIGN PATENTS 515,499  11/51  Belgium.

OTHER REFERENCES

"Photo-Electricity," Zworykin et al., published by John Wiley & Sons, Inc., London, 1949, pages 37 to 60.

RALPH G. NILSON, *Primary Examiner.*

WALTER STOLWEIN, *Examiner.*